July 3, 1945.  C. F. MENDEZ  2,379,820

HEATING DEVICE

Filed Dec. 17, 1942

Inventor
Ciro Fidel Mendez
By Ogle R. Singleton
Attorney

Patented July 3, 1945

2,379,820

UNITED STATES PATENT OFFICE 2,379,820

HEATING DEVICE

Ciro Fidel Mendez, New York, N. Y., assignor to Archibald Gold, New York, N. Y.

Application December 17, 1942, Serial No. 469,330

4 Claims. (Cl. 219—39)

My invention consists in a new and useful improvement in a heating device, and is designed more particularly to provide means for increasing the effectiveness of a source of heat, by the utilization of both direct and reflected heat rays emanating from such source, to affect a current of fluid passing through the device, whereby the fluid may be used as a heating agent. The particularly novel and useful features of my invention are the character and disposition of the source of heat, the conduit for the fluid, and means adapted to reflect heat rays emanating from the source to impinge upon the conduit. In my improved device, the conduit for the fluid has high thermal conductivity, to facilitate transfer of heat to the fluid, while the heat source, reflecting means and conduit are so insulated as to eliminate heat loss. The obvious advantage of my improved device is a very considerable increase in the amount of heat transmitted to the fluid, from any given amount of energy used in the heat source, because of the effective application of substantially all of the heat rays emanating from the source to the conduit from which they are transmitted to the fluid. My device may be adapted to use any suitable fluid, such as water, air or other gas, for the utilization of the heat. It is obvious that the device can be used as a central heating plant for buildings heated by hot air or hot water, or as a small unit for single room heaters, or as a water heater for domestic or commercial purposes.

While I have illustrated in the drawing filed herewith and have hereinafter fully described one specific embodiment of my invention, it is to be distinctly understood that I do not consider my invention limited to said specific embodiment, but refer for its scope to the claims appended hereto.

Figure 1:
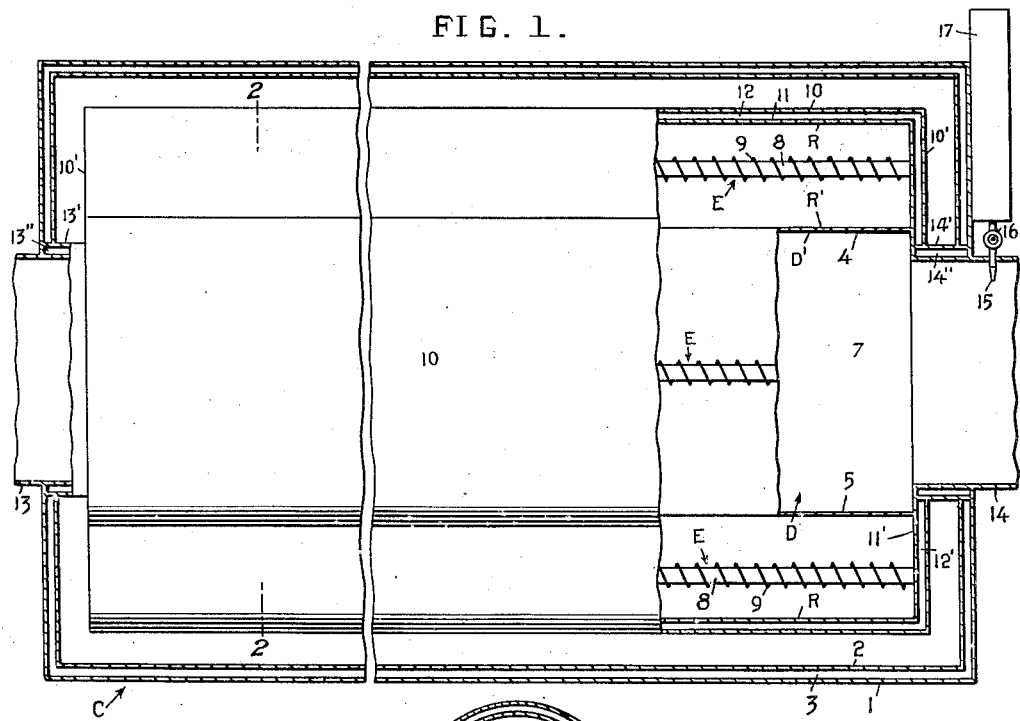
Fig. 1 is a side elevation of my device, the insulating casing being shown in section, and portions being broken away.

As illustrated in the drawing, the device is completely enclosed by a casing C comprising the outside wall 1 and the inside wall 2 with a space 3 between the walls 1 and 2, from which space 3 the air has been evacuated to produce a substantial vacuum, thereby forming a covering for the device which eliminates thermal conductivity. Suitably mounted in the casing C is the conduit or duct D, rectangular in cross-section, having the top and bottom walls 4 and 5 and the side walls 6 and 7, which walls are made of any suitable material having a very high degree of thermal conductivity. Suitably mounted adjacent each of these walls 4, 5, 6 and 7 is a source of heat in the form of an electric resistance heating element E consisting of a cylindrical insulating core 8 and wiring 9. These elements E are suitably provided with a source of electricity, with any suitable form of control mechanisms. The elements E are disposed parallel with the longitudinal axis of the duct D. Associated with each of the elements E is a parabolic reflector R. These reflectors R are so designed and mounted that their edges R' are disposed at the edges D' of the walls 4, 5, 6 and 7 of the duct D, so that the reflectors R precisely comprehend the walls respectively, the reflectors and walls being coterminous in length. Suitably disposed about the reflectors R is a housing 10 spaced from the outer surfaces 11 of the reflectors R to form a space 12 from which the air is evacuated to produce a substantial vacuum, thereby forming a covering for the reflectors R which eliminates thermal conductivity. The housing 10 has end walls 10' spaced from end walls 11' with the evacuated space 12' therebetween to close the channels formed by the reflectors R. Communicating with the duct D through the walls 11' are the intake pipe 13 and the outlet pipe 14, passed through the walls 1 and 2 of the casing C. The portions of the pipes 13 and 14 between the wall 1 and the walls 11' are insulated by housings 13' and 14' to form evacuated spaces 13" and 14" respectively.

The inlet pipe 13 is provided with a suitable blower (not shown) for inducing a flow of air through the duct D. The outlet pipe 14 is provided with a water supply pipe 15, with valve 16, from tank 17, for controlling the humidity of the air.

Figure 2:
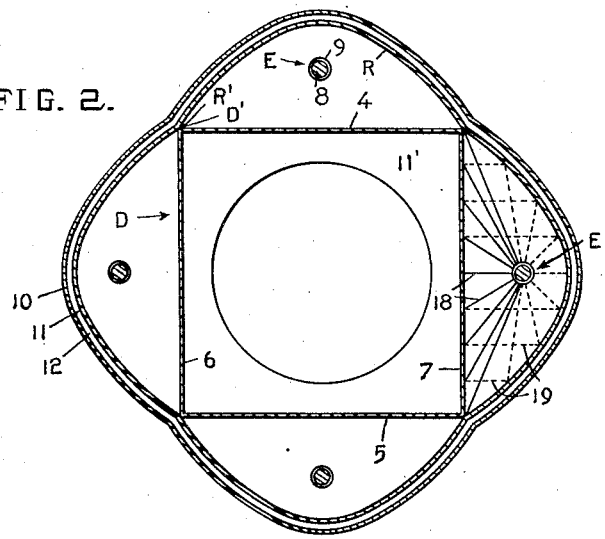
Fig. 2 is a transverse vertical section on the line 2—2 of Fig. 1.

From the foregoing description of the details of construction of my device, its use and operation will be obvious. When current is supplied to the heating element E, and a flow of air is induced through the duct D, the heat generated by the elements E will be transmitted by the walls 4, 5, 6 and 7 to this air. By reason of the design and relation of the parts of my device, both the direct and reflected heat rays impinge upon the walls 4, 5, 6 and 7. In Fig. 2, there is a diagrammatic illustration of this effect. It is to be noted that the rays 18 (solid lines) are projected directly from the element E to impinge upon the wall 7, and that the rays 19 (dotted lines) projected from the element E to the surface of the reflector R, are thereby reflected to impinge upon the wall 7, so that the entire surface of the wall 7 receives the heat of the direct rays 18 to which is added the heat of the reflected rays 19. Because of the insulation of the reflectors R by the housing 10 and evacuated space 12, thermal conductivity by the substance forming the reflectors R is eliminated, and because of the high thermal conductivity of the walls 4, 5, 6 and 7 substantially all of the heat of the combined rays 18 and 19 is transmitted to the air in the duct D.

It is to be particularly noted that by reason of the peculiar form and disposition of the reflectors R with relation to the walls 4, 5, 6 and 7, all of the heat rays emanating from the elements E are caused to impinge upon the walls 4, 5, 6 and 7, except the slight proportion of rays which are reflected to the element E.

It is obvious that as air enters the duct D from the inlet pipe 13, its temperature is progressively raised as it passes along the duct D, as it is subjected to the cumulative effect of the heat transmitted to it from the walls 4, 5, 6 and 7. It is also obvious that by duplication the air can be passed serially through a plurality of ducts D, the outlet pipe 14 of one duct serving as the inlet pipe of the following duct, and the temperature of the air will be progressively increased by its passage through the system.

The duct D can be formed by a plurality of tapered tubular members, so related that they are nested to produce oblique passages therebetween, inclined inwardly in the direction of flow of the air through the duct, to form aerodynamic shutters to stream line a direct flow of heat into the duct, to insure a maximum of heat transference from the elements E and reflectors R to the air in the duct.

Having described my invention, what I claim is:

1. In a heating device, the combination of a duct for the passage of a fluid into and out of the device, of high thermal conductivity; a plurality of heating means disposed about said duct; a reflecting means so associated with each of said heating means that substantially all of the heat rays emanating from each of said heating means, which do not directly impinge upon said duct, are reflected to impinge upon said duct; a casing enclosing said duct, heating means and reflecting means, from which air is evacuated, adapted to eliminate thermal conductivity from the heating means and the reflecting means, except by the duct; and a casing about the device, from which air is evacuated, adapted to eliminate thermal conductivity from the device, except by the fluid passing therefrom.

2. In a heating device, the combination of a duct provided with an inlet pipe and an outlet pipe; a plurality of heating elements symmetrically disposed about said duct; and a reflector associated with each element, the elements and reflectors being so related to each other and to the duct that a proportion of the heat rays emanating from the elements impinge directly upon the duct, and substantially all of the rest of said rays are reflected to impinge upon said duct.

3. In a heating device, the combination of a duct for the passage of a fluid into and out of the device, a plurality of cylindrical electric heating elements disposed adjacent said duct, parallel with the longitudinal axis of said duct; and a parabolic reflector so associated with each element that substantially all of the heat rays emanating from said element, which do not directly impinge upon said duct, are reflected to impinge upon said duct.

4. In a heating device, the combination of a duct for the passage of a fluid into and out of the device, rectangular in cross-section and having a high degree of thermal conductivity; a cylindrical electric heating element disposed adjacent the outer face of each wall of said duct, said elements being parallel with the longitudinal axis of said duct; a parabolic reflector so related to each element and its adjacent wall that edges of the reflector and wall coincide, so that the reflector precisely comprehends the wall, the walls, elements and reflectors being coterminous in length, and so related that substantially all of the heat rays emanating from said elements, which do not directly impinge upon said walls, are reflected to impinge upon said walls.

CIRO FIDEL MENDEZ.